(12) United States Patent
Talbot et al.

(10) Patent No.: US 11,160,210 B2
(45) Date of Patent: Nov. 2, 2021

(54) THREE-SECTION CROP HEADER WITH DRAPERS AND TOP CROSS AUGER

(71) Applicant: MacDon Industries Ltd., Winnipeg (CA)

(72) Inventors: Francois R. Talbot, Winnipeg (CA); Tyler James Maes, La Salle (CA)

(73) Assignee: MacDon Industries LTD., Winnipeg (CA)

( * ) Notice: Subject to any disclaimer, the term of this patent is extended or adjusted under 35 U.S.C. 154(b) by 157 days.

(21) Appl. No.: 16/440,438

(22) Filed: Jun. 13, 2019

(65) Prior Publication Data

US 2020/0390034 A1  Dec. 17, 2020

(51) Int. Cl.
*A01D 41/14* (2006.01)
*A01D 61/00* (2006.01)

(52) U.S. Cl.
CPC ......... *A01D 41/142* (2013.01); *A01D 61/004* (2013.01)

(58) Field of Classification Search
CPC .... A01D 41/142; A01D 41/14; A01D 61/004; A01D 61/008; A01D 61/002
USPC ........................................................ 56/14.5
See application file for complete search history.

(56) References Cited

U.S. PATENT DOCUMENTS

| 7,918,076 | B2* | 4/2011 | Talbot | A01D 41/14 |
| | | | | 56/208 |
| 10,477,767 | B2* | 11/2019 | Modak | A01D 61/008 |
| 10,477,770 | B2* | 11/2019 | Modak | A01D 41/142 |
| 2014/0075906 | A1* | 3/2014 | Heim | A01D 61/004 |
| | | | | 56/105 |
| 2017/0318745 | A1* | 11/2017 | Borry | A01D 61/004 |
| 2018/0054964 | A1* | 3/2018 | Fuchtling | A01D 75/287 |
| 2018/0368320 | A1* | 12/2018 | Schulze Selting | A01D 61/002 |
| 2019/0029180 | A1* | 1/2019 | Modak | A01D 61/02 |
| 2019/0029181 | A1* | 1/2019 | Modak | A01D 61/008 |
| 2019/0239433 | A1* | 8/2019 | McCrea | A01D 47/00 |

* cited by examiner

*Primary Examiner* — Alicia Torres
*Assistant Examiner* — Matthew Ian Neal
(74) *Attorney, Agent, or Firm* — Miller Canfield

(57) ABSTRACT

In a harvesting header having a main frame divided into a center portion and two wing portions connected for pivotal movement about axes and including a rear wall. A reel is mounted on first and second reel arms and a rear auger is mounted at the top of the rear wall. The reel and the auger are also divided into three sections arranged end to end along the rear wall. The joint in the auger is arranged not at the axis but at a position spaced inwardly of the axis so that a first flight of the auger extends inboard of the first reel arm and a second flight of the auger extends inboard of the second reel arm to carry the crop engaging the first flight past the first space to the center portion of the header frame.

7 Claims, 5 Drawing Sheets

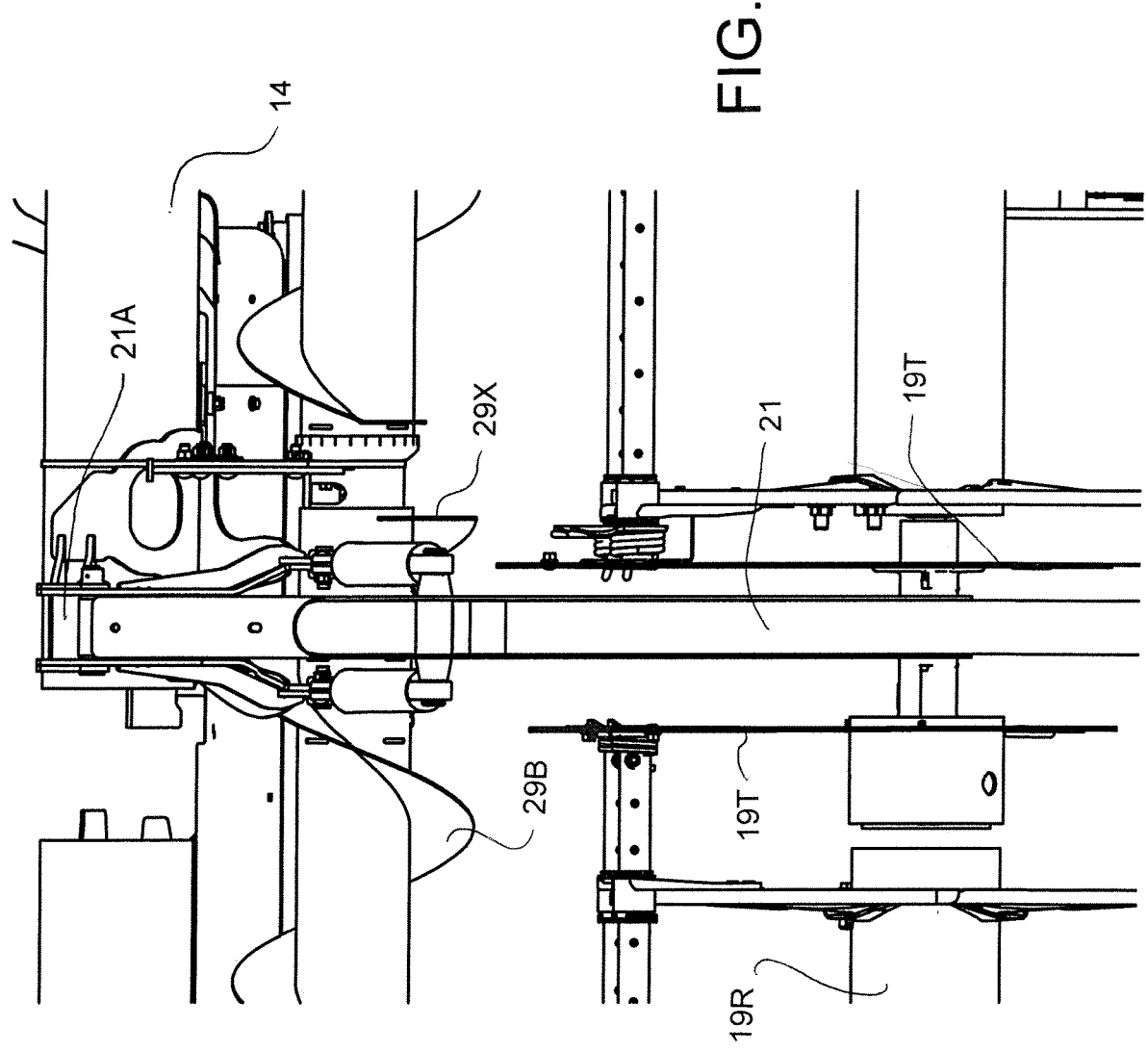

THREE-SECTION CROP HEADER WITH DRAPERS AND TOP CROSS AUGER

This invention relates to a harvesting header with a center section and two wing sections pivotal relative to forwardly extending pivot axes where the crop is transported from the cutter bar inwardly by two side drapers and there is provided a top cross auger along a top edge of a back sheet to assist in carrying tall crop inwardly.

BACKGROUND OF THE INVENTION

In published US Application 2018/0368320 published Dec. 27 2018 is disclosed a header defining a cutting system for attachment to a combine harvester with a three-part frame, the frame parts of which are articulately joined with each other to define a center part and two wing parts. The header further includes, a cutter bar, a reel, a central belt conveyor system or feed draper as well as lateral belt conveyor systems or side drapers for disposing of the crop material that are supported on the frame, such that the side drapers convey transversely to the direction of travel in the direction of the central belt conveyor system, and the central belt conveyor system conveys contrary to the direction of travel. The header includes a multi-part rear wall of the cutting system mounted on the individual frame parts, which extends along the rear of the side drapers and which includes a discharge opening for discharging the harvested crop to the combine harvester in the area of the central belt conveyor system.

The key part of this disclosure relates to the provision of a three-part screw conveyor or auger which extends across the operating width of the cutting system or cutter bar and is arranged above the side drapers and between the reel and the rear wall, and in particular that the length of the respective parts of the screw conveyor or auger correspond to the width of the three frame parts that is the center frame and the two wing frames. This corresponding width is selected so that swinging movements of the three frame parts with respect to each other, have no or only small differences in length, which can be compensated for via respective bearings in a simple and cost-effective manner.

Of course, as in all arrangements of this type where the auger or screw conveyor is divided into separate sections, the screw conveyor parts are connected by a joint drive, and adjacent parts of the screw conveyor are mutually connected by way of universal joints.

SUMMARY OF THE INVENTION

According to the invention there is provided a harvesting header for attachment to transport vehicle comprising:

a main frame having a coupling for mounting on the transport vehicle by which the header is carried on the transport vehicle in a forward direction;

a cutter bar at a forward end of the main frame;

a crop transfer system for transferring cut crop comprising first and second side drapers movable in a direction transverse to the forward direction with each side draper having a front edge adjacent the cutter bar;

the main frame having a center portion at the coupling and first and second wing portions each connected to a respective end of the center portion for pivotal movement relative to the center portion about a respective one of first and second pivot axes each generally parallel to the forward direction with the first and second axes lying in a plane at or adjacent the cutter bar;

a rear wall located at a rear edge of the side drapers and extending upwardly therefrom to a top edge of the rear wall;

and an auger located adjacent the top edge of the rear wall comprising an auger flight mounted on a longitudinally extending elongate rotatable member arranged such that rotation of the member drives the flight in a direction to carry crop inwardly toward a center of the header;

wherein the auger comprises three sections arranged end to end along the rear wall including a center section with a center flight, a first end section with a first end flight and a second end section with a second end flight;

wherein the first end section is connected to a first end of the center section by a first joint and the second end section is connected to a second end of the center section by a second joint;

where each of the first and second joints acts to transfer rotation from one section to another section at the joint;

where each of the first and second joints allows movement of said one section relative to the other section in a direction longitudinally of the auger; where each of the first and second joints allows change of an angle of an axis of the member of one section relative to an axis of the member of the other section at the joint;

wherein the first joint is arranged at a position spaced inwardly of the first axis and the second joint is arranged at a position spaced inwardly of the second axis.

In one arrangement, the rear wall is separated at the first and second pivot axes into a center wall portion and first and second wing wall portions so that a first space between a center wall portion and a first wing wall portion increases and decreases as the center portion and first wing portion pivot in clockwise and counter clockwise directions about the first pivot axis and so that a second space between the center wall portion and a second wing wall portion increases and decreases as the center portion and second wing portion pivot in clockwise and counter clockwise directions about the second pivot axis, wherein the first flight extends past the first space to carry the crop engaging the first flight past the first space to the center portion of the rear wall and wherein the second flight extends past the second space to carry the crop engaging the second flight past the second space to the center portion of the rear wall.

Not all headers that use the three piece auger have a split rear wall of the draper deck. While some do have this feature, the only split that exists in all configurations that use a three piece auger is the frame hinge axis.

Typically the header also includes a reel carried on reel arms mounted on the main frame and extending forwardly over the cutter bar, where the reel includes a first reel arm mounted on a first end of the center portion and a second reel arm mounted on the second end of the center portion. In this arrangement preferably the first flight extends also past the first reel arm and the support structure therefor and the second flight extends past the second reel arm and the support structure therefor. Again this avoids hang up of the crop at the junction point between the center and wing sections.

Yet further, typically the reel is divided into a center reel portion and first and second reel portions at respective ends of the center reel portion, where each reel portion has a plurality of tine bars at angularly spaced locations therearound where the tine bars of the center portion terminate at the first end in a first radial plane of the center portion and the tine bars of the center portion terminate at the second end in a second radial plane of the center portion. In this arrangement preferably the first flight extends past the first radial plane and the second flight extends past the second radial plane again to improve crop transfer past these potential hang up locations. In some cases the ends of the tine bars are connected by an end ring of the reel which supports the ends.

The three piece auger is intended for any header that could have a three piece reel, but it is also used on configurations of those same headers with only a two piece reel, so the reel split is not always present at the split in the auger. when the auger is used with a three piece reel, having it inboard of the reel split, reel support structure and arm, and frame hinge axis is beneficial.

In the present invention as defined therefore, the position of the joint in the auger is defined only in relation to the frame hinge axis. Optionally the joint in the auger also extends past the reel support arms and the mounting structure therefor including the operating cylinders, the split in the reels and the split in the rear wall of the draper decks where applicable.

Thus in the present invention the joints between the sections of the auger are arranged such that they are not aligned with the pivot points of the frame sections. Instead the auger sections of the wings are increased in length so that the crop is carried past the junction between the wing and the center section to avoid collection of the crop at a common junction point as in prior art arrangements.

In a preferred arrangement, the first joint includes a first mounting bracket carried on the first end of the center portion where the first joint is fixed to the center section of the auger, wherein the second joint includes a second mounting bracket carried on the second end of the center portion where the second joint is fixed to the center section of the auger, and wherein the first and second joints allow longitudinal sliding movement of the first and second wing frame sections of the auger relative to the first and second joints to accommodate pivotal movement of the portions of the header. Preferably in this arrangement the flight of the center section of the auger is removable and replaceable from the first and second joints. This allows the center section to be replaced for a different effect on the crop where there is provided at least two center sections with different flight dimensions.

Preferably the auger is driven from the first end so that the center section and second wing sections are driven through the first and second joints.

BRIEF DESCRIPTION OF THE DRAWINGS

One embodiment of the invention will now be described in conjunction with the accompanying drawings in which:

FIG. 5 is a top plan view of the section of FIG. 2 showing the reel, the connection between the reel sections at the joint and the relationship to the auger.

In the drawings like characters of reference indicate corresponding parts in the different figures.

DETAILED DESCRIPTION

Figure 1:
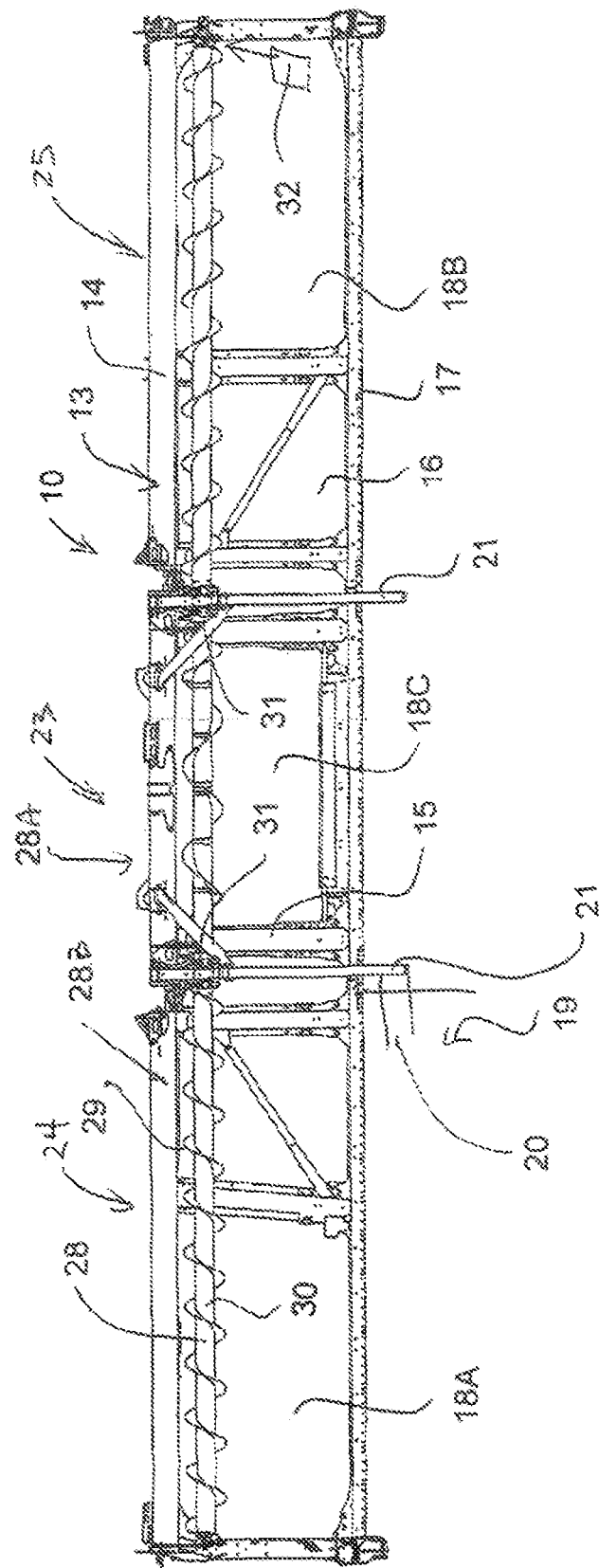
FIG. 1 is a top plan view of a header according to the present invention.
Figure 2:
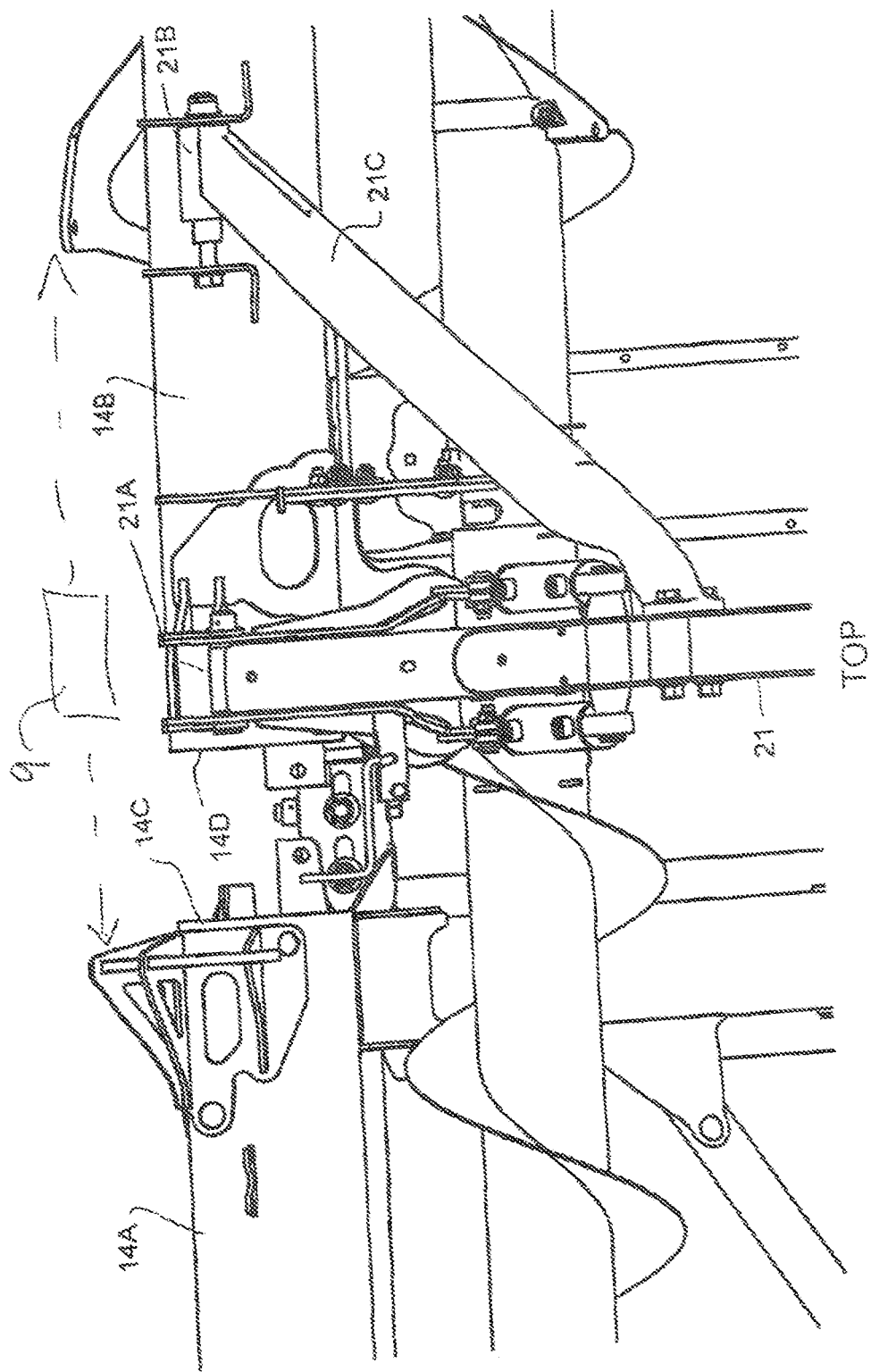
FIG. 2 is a top plan view of the header of FIG. 1 showing on an enlarged scale the section adjacent the joint between the wing section and the center section with the reel omitted for convenience of illustration.

In FIG. 1 is shown in plan view a header 10 of the type shown and described in U.S. Pat. No. 7,918,076 (Talbot) assigned to the present applicant and issued on Apr. 5, 2011 which is carried on an adapter (not shown) or mounting assembly attached to the feeder house of a combine harvester. The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house not shown. The draper system 18 thus include two side drapers 18A, 18B extending from respective ends of the header inwardly toward the feeder house and a center adapter section 18C which acts to feed the crop from the side drapers 18A, 18B rearwardly to the feeder housing.

The header further includes a reel 19 including a beam 20 on which is mounted a plurality of reel bats (not shown) which are carried on the beam for rotation with the beam around the axis of the beam. The beam is carried on reel support arms 21 which extend from the beam rearwardly and upwardly to a support bracket attached to the transverse main beam 14. The reel arms can be raised and lowered by hydraulic cylinders (not shown) connected between the respective arm and the beam 14.

In the embodiment shown the reel is mounted on four arms 21 including two arms at the ends of the header and a two center arms being spaced apart either side of the adapter 11. It is well known to provide an arrangement of the beam and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The main frame has the adapter or coupling for mounting on the transport vehicle by which the header is carried on the transport vehicle in a forward direction.

As described in detail in the above patent, the main frame has a center portion 23 at the coupling and first and second wing portions 24, 25 each connected to a respective end of the center portion for pivotal movement relative to the center portion about a respective one of first and second pivot axes each generally parallel to the forward direction with the first and second axes lying in a plane at or adjacent the cutter bar. The pivot axis at one side is shown specifically at the coupling 26 in FIG. 3 which is located at the rear of the frame and aligned with the cutter bar and acts to support the wing section while allowing pivotal movement of the wing section around the coupling 26. A balance mechanism indicated schematically at 9 and described in detail in the cited patent lifts the wing section with a required lift force which is balanced relative to the lift force applied to the center section by the adapter to apply a required force to the ground during the harvesting action. Full details of this system are described in the above patent.

The pivotal movement which occurs to follow ground contour provides pivotal movement of the center and wing frame parts to that a space between the main beam portions 14A and 14B of the main beam 14 increases and decreases at the ends 14C and 14D.

A rear wall 27 is located at a rear edge of the side drapers and extends upwardly therefrom to a top edge of the rear wall at the main beam 14. Again the rear wall is separated at the first and second pivot axes into a center wall portion 27B and first and second wing wall portions 17A with a space 27X between the end edges 27C and 27D of those wall portions. Again therefore the space between the center wall portion 27B and a first wing wall portion 27A increases and decreases as the center portion and first wing portion pivot in clockwise and counter clockwise directions about the coupling 26.

The rear wall has a bottom edge just behind the rear edge of the side drapers and extends upwardly and rearwardly from the side drapers to confine the crop at the rear of the header.

As is well known, an auger 28 is located adjacent the top edge of the rear wall and includes an auger flight 29 mounted on a longitudinally extending elongate rotatable tube 30 arranged such that rotation of the tube in a direction forwardly and downwardly acts to drive the flight in a direction to carry crop inwardly toward a center of the header.

The auger 28 comprises three sections arranged end to end along the rear wall including a center section 28A with a center flight 29A, a first end section 28B with a first end flight 29B and a second end section with a second end flight. The end sections are connected to first and second ends of the center section 28A by joints 31 which act to transfer rotation from one section to another section at the joint so that the auger is driven from one end at a drive mechanism schematically indicated at 32.

Figure 4:
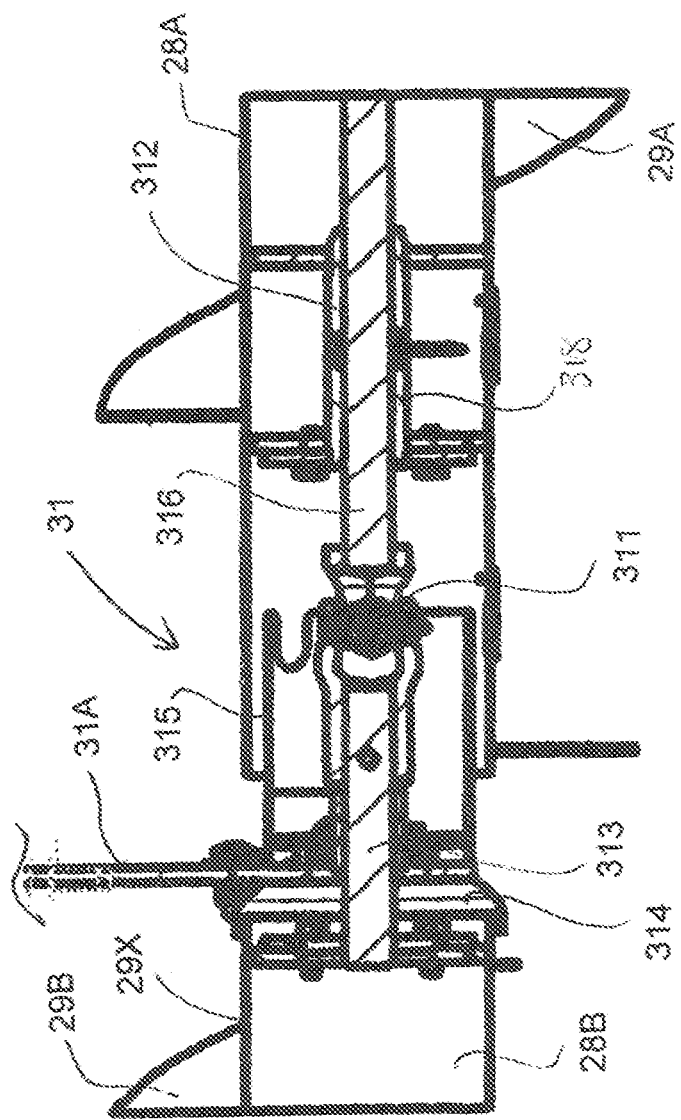
FIG. 4 is a cross sectional view along the lines 4-4 of FIG. 3.

The joints as best shown in FIG. 4 include a universal coupling and a slide coupling which allow each of the first and second joints to provide movement of said one section relative to the other section in a direction longitudinally of the auger and change of an angle of an axis of the member of one section relative to an axis of the member of the other section at the joint.

Thus as shown in FIG. 4 each joint 31 comprises a universal coupling 311 and a slide coupling 312 housed within the tube of the auger portion 28A. Each joint 31 therefore includes a mounting bracket 31A carried on the first end of the center portion of the frame. The joint 31 is fixed by the bracket or plate 31A to the outer end of the center section of the frame at the first wing section of the auger. The joints 31 allow longitudinal sliding movement of the wing sections of the auger relative to the first and second joints to accommodate pivotal movement of the portions of the header.

The plate 31A is fastened to the portion 28B of the auger by a shaft 313 bolted to an end plate 314 of the tube of the portion 28B. the shaft 313 extends outwardly from the end of the tube within a sleeve 315 which projects into the end of the tube of the portion 28A. the sleeve 315 houses the universal coupling 311 which connects to a shaft 316 within the tube of the portion 28A. The universal joint holds the shafts 313 and 316 end to end while communicating rotational movement through the coupling and while allowing limited changes of angle between the shafts to accommodate the relative movement between the portions 28A and 28B of the auger. The shaft 316 passes through a bushing 318 forming the slide coupling 312 so that the portions 28A and 28B can move toward one another and apart over a limited distance to accommodate a change in distance of the outer end mounting of the portion 28B and the portion 28A. the bushing 318 is mounted at a fixed position on the axis of the portion 28A of the auger and is held against sliding movement therealong so that the sliding movement required is provided by the movement of the shaft in the bushing. The flights 29A and 29B extend as far along the respective auger portion as close to the bracket or plate 31A as possible to assist in transfer of crop across the area at the bracket 31A.

Figure 3:
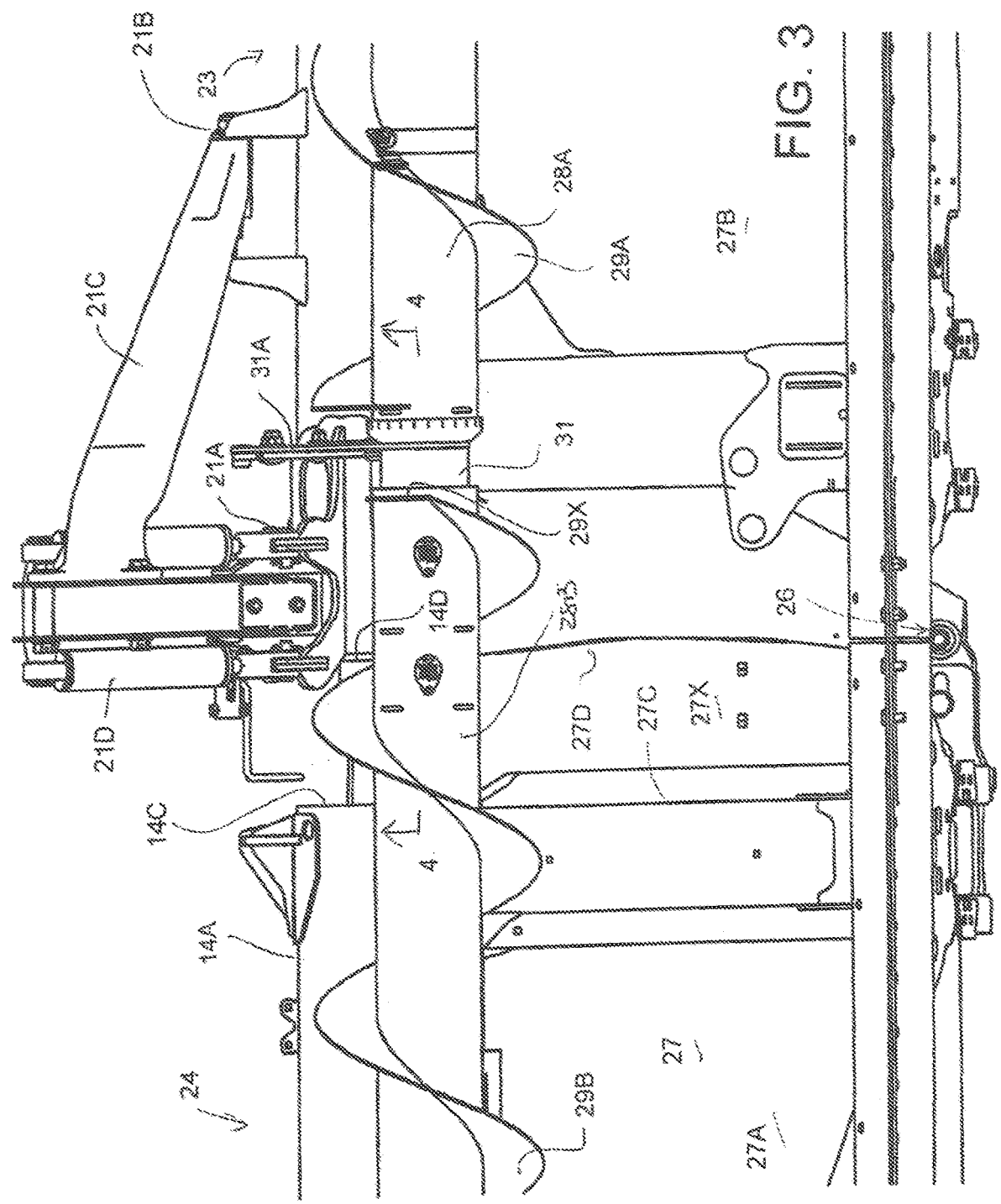
FIG. 3 is a front elevational view of the section of the header of FIG. 2.

As best shown in FIG. 3, the joints 31 are arranged at a position spaced inwardly of the coupling 26 so that the first flight 29B extends past the first space 27X to carry the crop engaging the first flight past the first space 27X to the center portion 27B of the rear wall 27. Thus the end edge 29X of the flight 29B is located inwardly of the edge 27B of the rear wall and inwardly of the end edge 14D of the main beam so as to carry the crop past the edges and the obstacle to movement caused thereby and onto the rear wall portion of the center section.

The reel 19 includes first reel arms 21 mounted on the ends of the center portion just inside the end edge 14D on the main beam. The arm is mounted on a pivot mounting 21A on the beam and is braced by an angle brace member 21C pivotally mounted also on the main beam 14. The arm can be raised and lowered by cylinders 21D.

As shown in FIG. 5, the reel beams are mounted each on a respective side of the arm 21 so as to leave a space between the reels at the arms.

Each reel includes as conventional a plurality of bats 19R at spaced positions around the main beam of the reel. The bats carry tine fingers (not shown) as commonly known in the art. The ends of the bats are mounted on an end disk 19T located just at the side of the arm 21.

In view of its length extending onto the center section, the first flight 29B extends past the first reel arm 21 and past the first radial plane containing the disk 19T. Thus the end edge 29X of the flight is inward of the plane of the disk 19T on the side of the arm 21 at the center section.

The flighting of the center section of the auger is removable and replaceable from the first and second joints so that there can be provided at least two center sections with different flight dimensions.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A harvesting header for attachment to transport vehicle comprising:
    a main frame having a coupling for mounting on the transport vehicle by which the header is carried on the transport vehicle in a forward direction;
    a cutter bar at a forward end of the main frame;
    a crop transfer system for transferring cut crop comprising first and second side drapers movable in a direction transverse to the forward direction with each side draper having a front edge adjacent the cutter bar and a center draper disposed between said first and second side drapers;
    the main frame having a center portion at the coupling and first and second wing portions each connected to a respective end of the center portion by pivots defining first and second pivot axes for pivotal movement relative to the center portion about a respective one of the first and second pivot axes each generally parallel to the forward direction with the first and second pivot axes lying in a plane at or adjacent the cutter bar, said center portion supporting said center draper and said first and second wing portions supporting said respective first and second side drapers;
    a rear wall located at a rear edge of the side drapers and extending upwardly therefrom to a top edge of the rear wall;
    and an auger located adjacent the top edge of the rear wall comprising an auger flight mounted on a longitudinally extending elongate rotatable member arranged such that rotation of the member drives the flight in a direction to carry crop inwardly toward a center of the header;

wherein the auger comprises three sections arranged end to end along the rear wall including a center section with a center flight, a first end section with a first end flight and a second end section with a second end flight;

wherein the first end section is connected to a first end of the center section by a first joint and the second end section is connected to a second end of the center section by a second joint;

where each of the first and second joints acts to transfer rotation from one section to another section at the joint;

where each of the first and second joints allows movement of said one section relative to the other section in a direction longitudinally of the auger;

where each of the first and second joints allows change of an angle of an axis of the member of one section relative to an axis of the member of the other section at the joint;

wherein the first joint is arranged at a position spaced inwardly of the first axis and above said center draper and the second joint is arranged at a position spaced inwardly of the second axis and above said center draper; and a reel carried on reel arms mounted on the main frame and extending forwarding over the cutter bar, wherein the reel includes a first reel arm mounted on a first end of the center portion and a second reel arm mounted on the opposite second end of the center portion and wherein the first flight extends inboard of the first reel arm and the second flight extends inboard of the second reel arm.

2. The harvesting header according to claim 1 wherein the rear wall is separated at the first and second pivot axes into a center wall portion and first and second wing wall portions so that a first space between a center wall portion and a first wing wall portion increases and decreases as the center portion and first wing portion pivot in clockwise and counter clockwise directions about the first pivot axis and so that a second space between the center wall portion and a second wing wall portion increases and decreases as the center portion and second wing portion pivot in clockwise and counter clockwise directions about the second pivot axis, wherein the first flight extends inboard of the first space to carry the crop engaging the first flight past the first space to the center wall portion of the rear wall and wherein the second flight extends inboard of the second space to carry the crop engaging the second flight past the second space to the center wall portion of the rear wall.

3. The harvesting header according to claim 1 including a reel carried on reel arms mounted on the main frame and extending forwardly over the cutter bar, wherein the reel is divided into a center reel portion and first and second reel portions at respective ends of the center reel portion, wherein each reel portion has a plurality of tine bars at angularly spaced locations therearound where the tine bars of the center portion terminate at the first end in a first radial plane of the center portion and wherein the tine bars of the center portion terminate at the second end in a second radial plane of the center portion and wherein the first flight extends past the first radial plane and the second flight extends past the second radial plane.

4. The harvesting header according to claim 1 wherein the first joint includes a first mounting bracket carried on the first end of the center portion where the first joint is fixed to the center section of the auger, wherein the second joint includes a second mounting bracket carried on the second end of the center portion where the second joint is fixed to the center section of the auger, and wherein the first and second joints allow longitudinal sliding movement of the first and second end sections of the auger relative to the first and second joints to accommodate pivotal movement of the portions of the header.

5. The harvesting header according to claim 4 wherein the flight of the center section of the auger is removable and replaceable from the first and second joints.

6. The harvesting header according to claim 5 wherein there is provided at least two center sections with different flight dimensions.

7. The harvesting header according to claim 1 wherein the auger is driven from the first end so that the center section and end sections are driven through the first and second joints.

* * * * *